United States Patent [19]

Kuse

[11] Patent Number: 5,052,735
[45] Date of Patent: Oct. 1, 1991

[54] AUTO-CLAMPER FOR PALLETS

[75] Inventor: Hisao Kuse, Ishikawa, Japan

[73] Assignee: Tsudakoma Kogyo Kabushiki Kaisha, Japan

[21] Appl. No.: 421,148

[22] Filed: Oct. 13, 1989

[30] Foreign Application Priority Data

Oct. 14, 1988 [JP] Japan .................... 63-258921
Dec. 23, 1988 [JP] Japan .................... 63-327299
May 16, 1989 [JP] Japan .................... 1-123966

[51] Int. Cl.$^5$ .................... B66C 1/26; B66C 1/28
[52] U.S. Cl. .................... 294/81.5; 294/81.51; 294/81.54
[58] Field of Search .................. 294/81.5, 81.51, 81.53, 294/810, 54, 81.56, 81.6, 81.61, 82.24, 82.26, 82.31, 68.27, 110.1

[56] References Cited

U.S. PATENT DOCUMENTS

| 2,403,346 | 7/1946 | Deiters .................. 294/110.1 X |
| 2,425,421 | 8/1947 | Deily .................. 294/81.51 |
| 2,547,502 | 4/1951 | Smith et al. .................. 294/81.51 X |
| 3,257,142 | 6/1966 | Barry .................. 294/110.1 X |
| 3,261,637 | 7/1966 | Bopp et al. .................. 294/110.1 X |
| 3,677,506 | 7/1972 | La Roe .................. 294/82.26 X |
| 4,202,576 | 5/1980 | Hasquenoph et al. .................. 294/82.26 |

FOREIGN PATENT DOCUMENTS 3023689 1/1982 Fed. Rep. of Germany ... 294/110.1

Primary Examiner—Margaret A. Focarino
Assistant Examiner—Dean J. Kramer
Attorney, Agent, or Firm—Lerner, David, Littenberg, Krumholz & Mentlik

[57] ABSTRACT

In construction of a clamper for automatically clamping a pallet carrying a workpiece to a clamp table on, for example, a cutting machine, a clamp spring is attached to a hook piece used for hoisting the pallet in an arrangement such that turning of the hook piece in the unclamping direction at hoisting the pallet should deform the clamp spring to store its strain energy, and that opposite turning of the hook piece should cause release of the strain energy by the clamp spring on restoration from deformation to firmly engage a clamper head to an anchor block on the clamp table. Use of the strain energy for clamping operation well avoids conventional need for pneumatic or hydraulic pressure and interfaces to be otherwise interposed between a pressure source and the clamper.

8 Claims, 18 Drawing Sheets

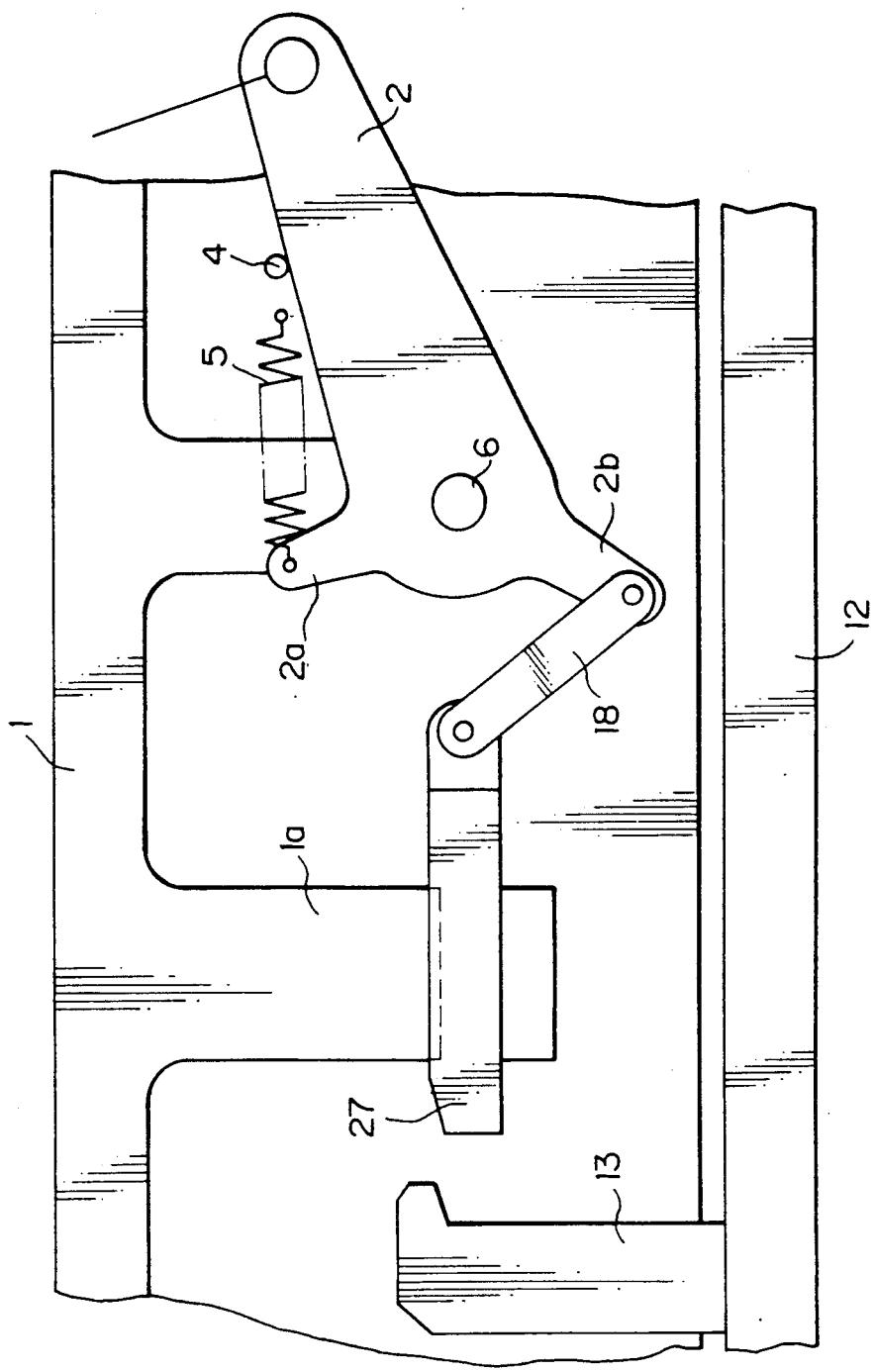

AUTO-CLAMPER FOR PALLETS

BACKGROUND OF THE INVENTION

The present invention relates to an improved auto-clamper for pallets, and more particularly relates to an improvement in automatic clamping of a pallet carrying a workpiece to a working table on, for example, a cutting machine.

Manual or automatic operation is conventionally employed in clamping a pallet carrying a workpiece to a working table of a machine, such as a cutting machine. Increased weight of a large workpiece, however, makes it quite infeasible to correctly clamp the pallet by manual operation. In addition, with the recently growing demand for full automation in a production line, it is generally required to remove manual operations from the production line as much as possible. For these reasons, automatic clamping is now broadly employed in the field of machining of workpieces. Automatic clamping is generally carried out utilizing pneumatic or hydraulic pressure, thereby increasing the running cost of an auto-clamper. In addition, one or more interfaces have to be interposed between the pressure source and the clamper and use of such interfaces tends to increase the installation cost of the working machine. Further, the mode of combination of such an interface with a clamper differs from machine to machine. In general, one type of interface cannot span machines of different types. Thus the conventional auto-clampers are quite unsuited for universal applications.

SUMMARY OF THE INVENTION

It is the object of the present invention to provide a universal type auto-clamper which is able to operate without any assistance by pneumatic and hydraulic pressures.

According to the basic aspect of the present invention, at least one hook piece is turnably mounted to a pallet in mechanical connection with a clamp spring fixed to the pallet, turning of the hook piece at hoisting of the pallet causes spring deformation which stores corresponding strain energy in the clamp spring, and the strain energy so stored is released to clamp the pallet to a clamp frame via a clamper head associated with the hook piece.

BRIEF DESCRIPTION OF THE DRAWINGS

FIG. 1 is an end view of the entire arrangement of one embodiment of the auto-clamper in accordance with the present invention, FIG. 2 is a partial side view of the auto-clamper in an unclamped position, FIG. 3 is a partial side view of the auto-clamper in a clamped position, FIGS. 4 to 6 are side, partly sectional end and partly sectional side views of the main part of the auto-clamper in the unclamped position, FIGS. 7 and 8 are side and partly sectional end views of the auto-clamper in the clamped position, FIGS. 9A and 9B are side views of another embodiment of the auto-clamper in accordance with the present invention in the unclamped and clamped positions, respectively, FIGS. 10A and 10B are side views of the other embodiment of the auto-clamper in accordance with the present invention in the unclamped and clamped positions, respectively, FIGS. 11A and 11B are side views of the other embodiment of the auto-clamper in accordance with the present invention in the unclamped and clamped positions, respectively, FIGS. 12A and 12B are side view of the other embodiment of the auto-clamper in accordance with the present invention in the unclamped and clamped positions, respectively, FIGS. 13A and 13B are side views of the other embodiment of the auto-clamper in accordance with the present invention in the unclamped and clamped positions, respectively, FIGS. 14A and 14B are side view of the other embodiment of the auto-clamper in accordance with the present invention in the unclamped and clamped positions, respectively, FIG. 15 is a sectional side view of the other embodiment of the auto-clamper in accordance with the present invention, FIG. 16A is a sectional view of the auto-clamper shown in FIG. 15, FIG. 16B is a section taken along a line XVIB—XVIB in FIG. 15, and FIGS. 17A to 17C are side views, partly in section, for showing the operation of the auto-clamper shown in FIG. 15.

DESCRIPTION OF THE PREFERRED EMBODIMENTS

One embodiment of the auto-clamper in accordance with the present invention is shown in FIGS. 1 to 8. The unclamped position of the auto-clamper is shown in FIGS. 1 and 2 in which four sets of hook pieces 2 are provided on a pallet 1 and the pallet 1 is hoisted by an overhead hoist mechanism not shown via hooks 3 in engagement with the hook pieces 2. A clamp frame 12 on a machine is provided on its upper face with register blocks 11, anchor blocks 13 for engagement of the pallet 1 with the clamp frame 12 and a positioning pin 14. In this position, each hook piece 2 turns in an unclamping direction B as shown in FIG. 4 to abut a stopper 4 on the pallet 1 and hoist the pallet 1. As the hook piece 2 turns in the unclamping direction B, a clamp spring 5, a tension spring in this example, mechanically connected to the hook piece 2 is stretched so that strain energy should be stored in the clamp spring 5 as later described in more detail.

As shown in FIGS. 4 to 6, the hook piece 2 is secured to one end of a horizontal support shaft 6 which is axially rotatably mounted to the side face of the pallet 1. In the case of this embodiment, the clamper head is given in the form of a clamp piece 7 idly inserted over the other end of the support shaft 6. As shown in FIG. 5, the support shaft 6 is made up of a thick section 6*a* in engagement with the hook piece 2 and a thin section 6*b* in engagement with the clamp piece 7. The center axis of the thin section 6*b* is eccentric with respect to the center axis of the thick section 6*a*. As the hook piece 2 turns to rotate the support shaft 6, the center axis of the thin section 6*b* rotates around the center axis of the thick section 6*a*. This eccentric relationship between the two axes is very important in the construction of this embodiment.

A stopper 8 radially projects from the support shaft 6 to limit turning of the clamp piece 7 by its abutment. As shown in FIG. 5, a back-up spring 9 is interposed between the pallet 1 and the clamp piece 7 so that the clamp piece 7 should always be urged to turn in a clamping direction A.

Figure 1:
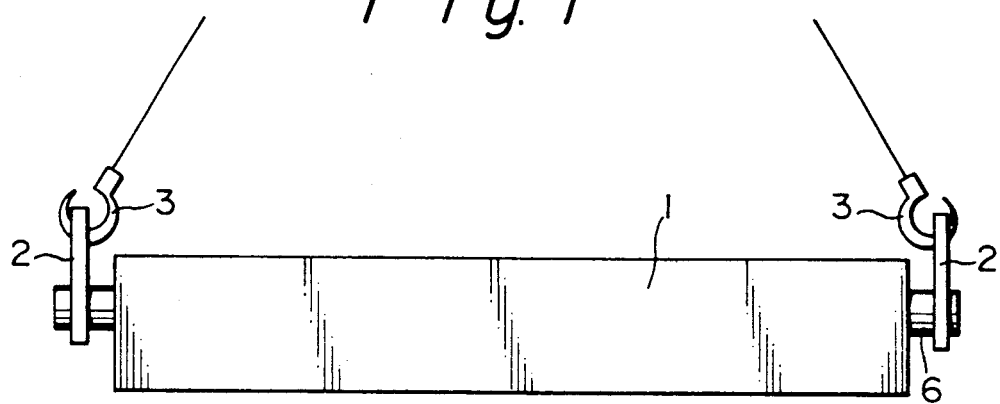
Figure 1:
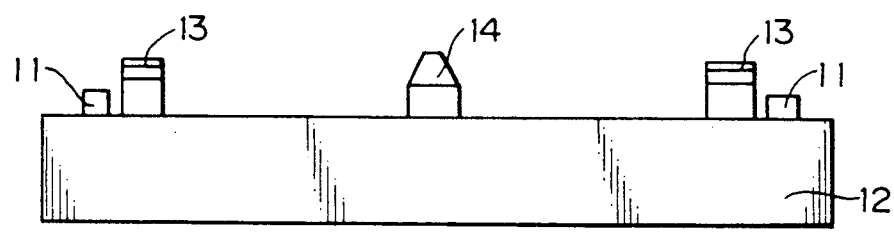
Figure 2:
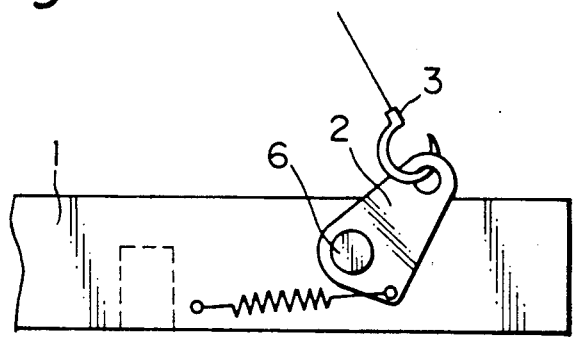
Figure 2:
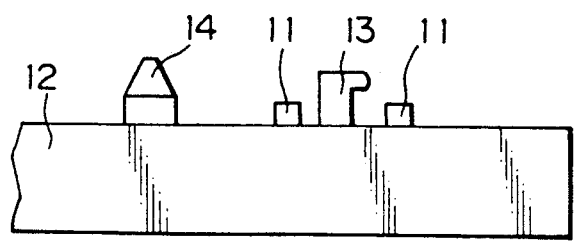
Figure 3:
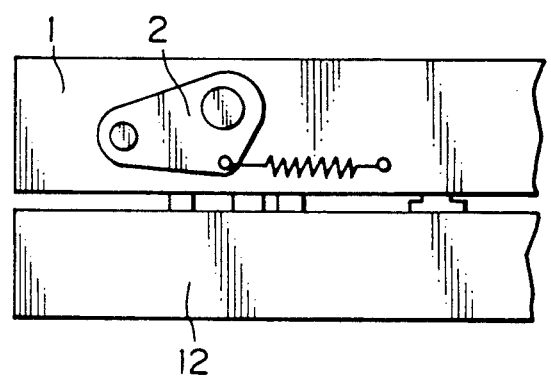
Figure 4:
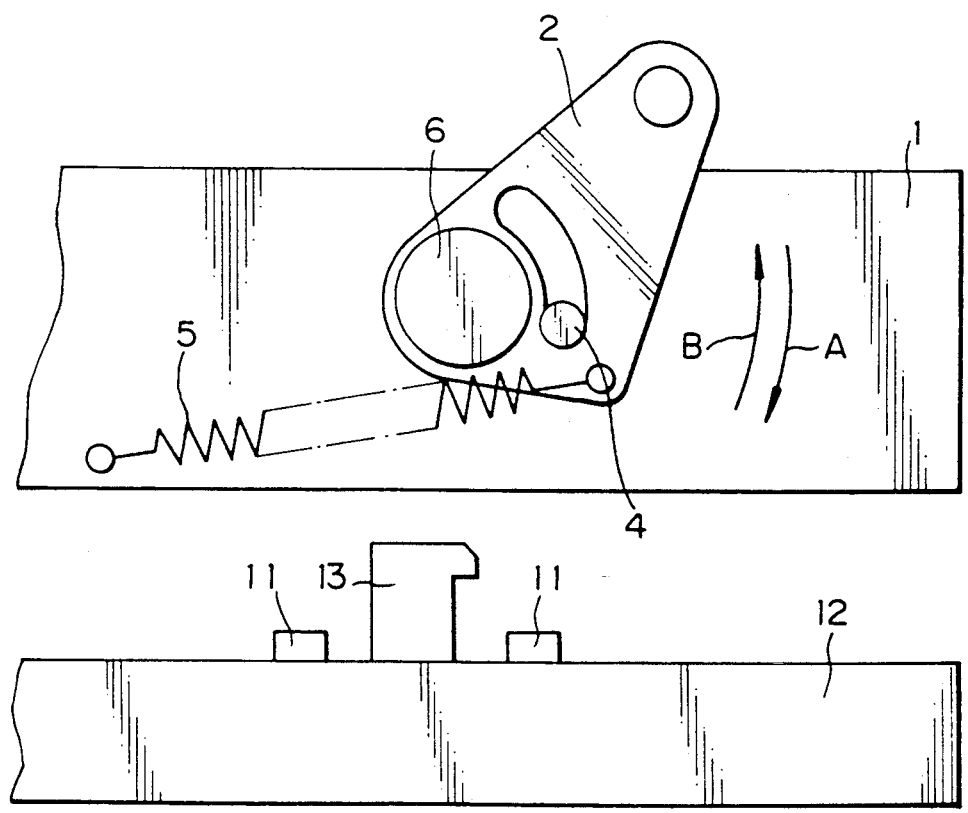
Figure 5:
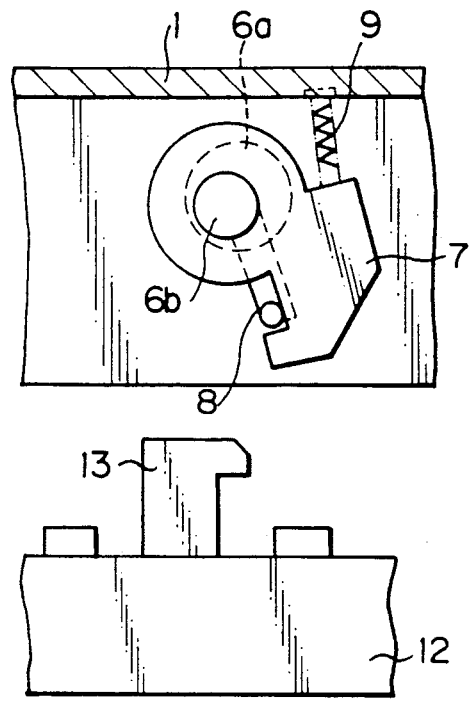
Figure 6:
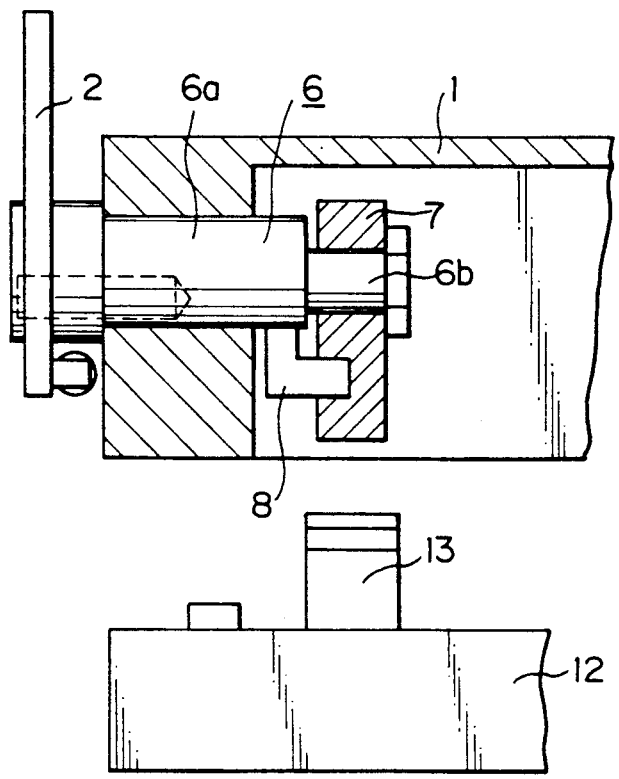
Figure 7:
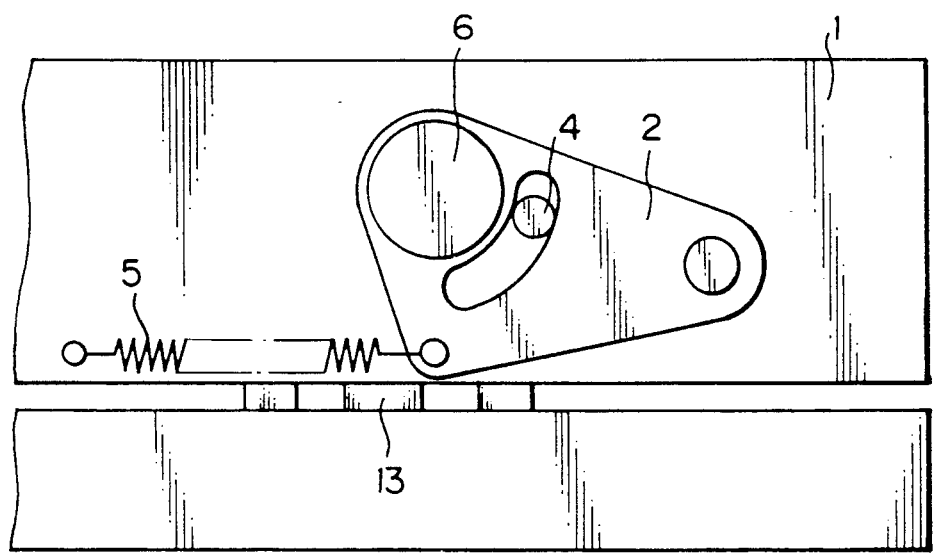
Figure 8:
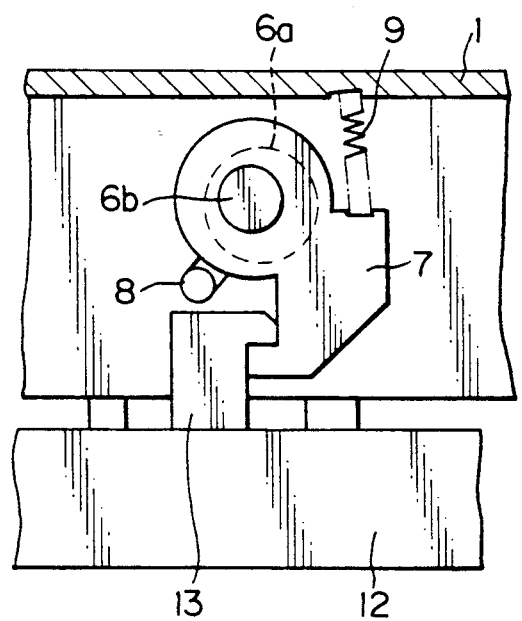

When the pallet 1 is hoisted as shown in FIGS. 4 and 5, the hook piece 2 is turned in the unclamping direction B and the clamp spring 5 connected thereto is stretched to store strain energy therein. By this turning of the hook piece 2 the clamp piece 7 is brought out of engagement with the anchor block 13 on the clamp frame 12 at the end of its movement in the unclamping direction B. Due to the above-described eccentric relationship on the support shaft 6, turning of the hook piece 2 out of the engagement with the anchor block 13 moves the clamp piece 7 upwards.

Lowering of the pallet 1 terminates when it comes into contact with the register block 11 on the clamp frame 12. With a continued downward movement of the hook piece 2, the hook piece 2 starts to turn in the clamping direction A due to the operation of the clamp spring 5 while gradually releasing the strain energy stored therein. Concurrently the support shaft 6 also starts to rotate in the same direction. This rotation of the support shaft 6 in the clamping direction A allows the clamp piece 7 to turn in the clamping direction A over a same angel of rotation due to operation by the back-up spring 9.

During this process, the stopper 8 on the support shaft 6 is kept in contact with the clamp piece 7 to control rotation of the clamp piece 7 whilst turning in synchronism with rotation of the support shaft 6. The clamp piece 7 ceases its turning in the clamping direction A as it comes into engagement with the anchor block 13 on the clamp frame 12. The hook piece 2 further continues its turning due to release of the strain energy stored in the clamp spring 5. This turning of the hook piece 2 is accompanied with concurrent rotation of the support shaft 6 fixed thereto. By this continued rotation of the support shaft 6, the stopper 8 gets out of contact with the clamp piece 7 which is then moved upwards due to the above-described eccentric relationship. As a result of this upward movement, the clamp piece 7 is brought into a firm engagement with the anchor block 13 on the clamp frame 12. Thus, the pallet 1 is fixed to the clamp frame 12 by a strong clamp force.

In order to disengage the pallet 1 from the clamp frame 12, the pallet 1 is again hoisted by the hoist mechanism. Then the entire elements act in a quite opposite fashion to disengage the clamp piece 7 from the anchor block 13 on the clamp frame 12, thereby liberating the pallet 1.

For balanced hoisting of the pallet 1, at least a pair of hooks 2 should preferably be provided on the pallet 1 in practice.

In the above-described process, the weight of the pallet and the workpiece carried thereby, i.e. their potential energy is converted into the strain energy of the clamp spring and the strain energy so stored in the clamp spring is released at the very moment of clamping. As a consequence, clamping and unclamping can be carried out only by hoisting and lowering the pallet above the clamp frame of the machine without use of any pneumatic or hydraulic pressure and use of any interfaces.

Figure 9A:
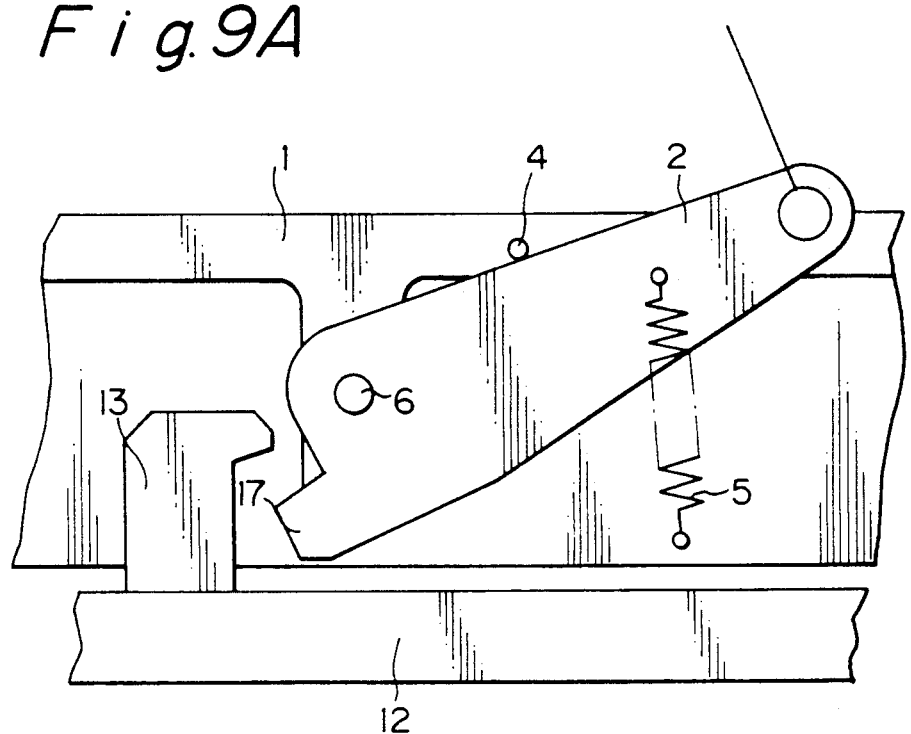
Figure 9B:
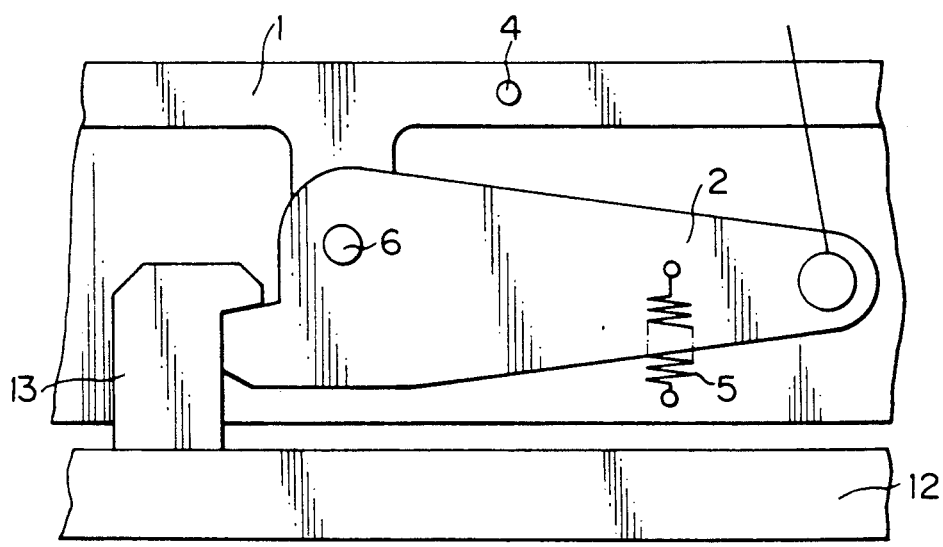

Another embodiment of the auto-clamper in accordance with the present invention is shown in FIGS. 9A and 9B, in which the clamper head is given in the form of a clamp nose 17 formed at the free end of the hook piece 2. Like the foregoing embodiment, the hook piece 2 is secured to the support shaft 6 rotatably mounted to the pallet 1 and the clamp spring 5, a tension spring in this example, is interposed between the hook piece 2 and the pallet 1. Another type of spring may be used for the clamp spring 5. The stopper 4 is secured to the pallet 1 at a position to limit upwards turning of the hook piece 2 in the unclamping direction B.

In the position shown in FIG. 9A, the pallet 1 is hoisted and the hook piece 2 turns upwards out of engagement of the anchor block 13 on the clamp frame 12. The clamp spring 5 is stretched in this position to store the strain energy. As the pallet 1 is lowered and brought into contact with the clamp frame 12, the hook piece 2 starts to turn downwards and the clamp spring 5 gradually releases the strain energy stored therein during hoisting. By continued turning of the hook piece 2, its clamp nose 17 comes into engagement with the anchor block 13 on the clamp frame 12 as shown in FIG. 9B to terminate the clamping pall.

Figure 10B:
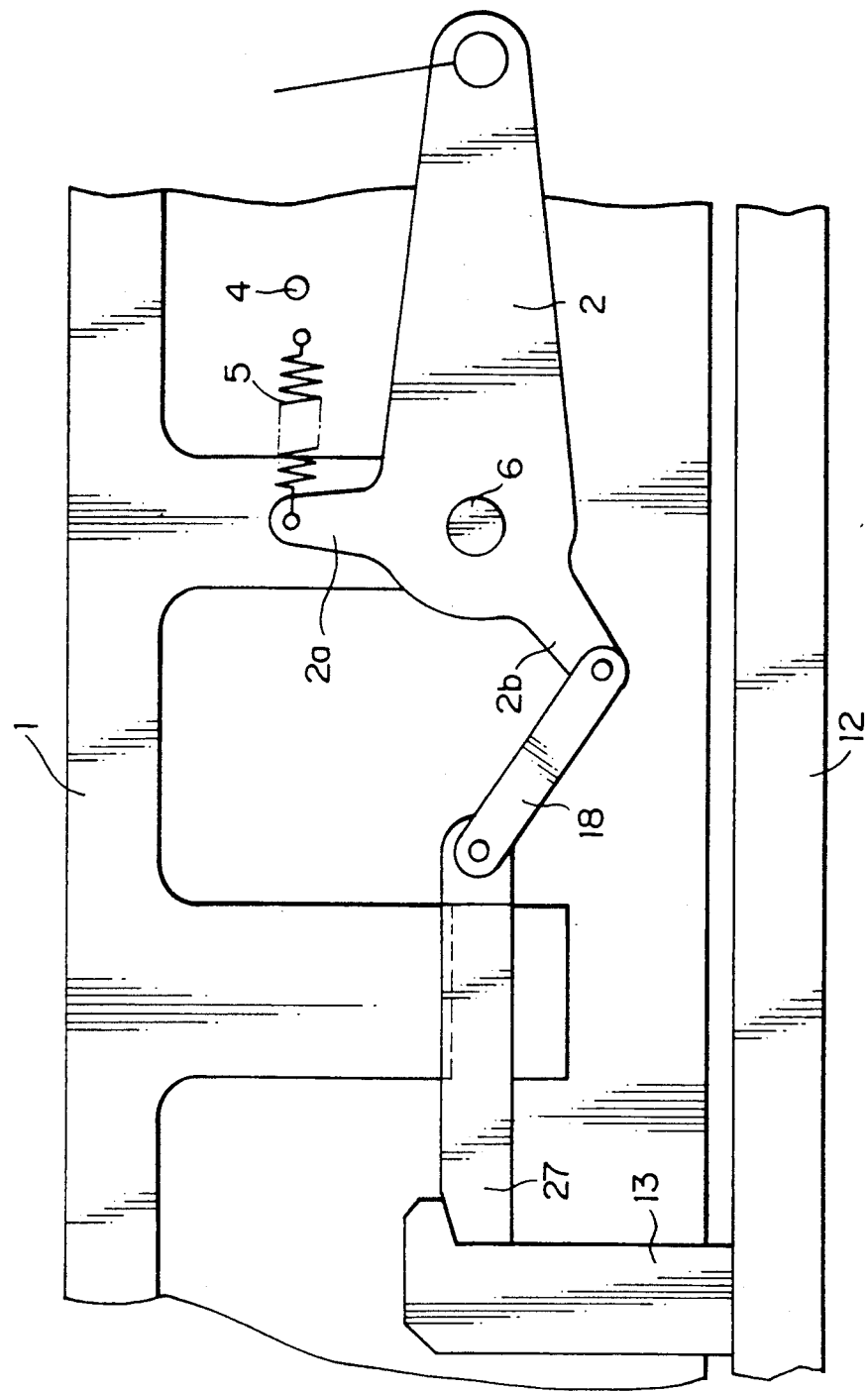

The other embodiment of the auto-clamper in accordance with the present invention is shown in FIGS. 10A and 10B, in which the hook piece 2 is connected to the clamper head via a single link mechanism. More specifically, the hook piece 2 is provided, near the support shaft 6, with an upper projection 2a and a lower projection 2b. The clamp spring 5 is interposed between the upper projection 2a of the support shaft 2 and the pallet 1 whereas the lower projection 2b is pivoted to one end of a link 18. The other end of the link 18 is pivoted to the proximal end of a clamp slide 27 which is guided for sliding in a horizontal direction by a leg 1a of the pallet 1 so as to move towards and away from the anchor block 13 on the clamp frame 12.

In the position shown in FIG. 10A, the pallet 1 is hoisted and the hook piece 2 turns in the unclamping direction B against the force by the clamp spring 5 with the clamp slide 27 being out of engagement with the anchor block 13. As the pallet 1 is lowered, the hook piece 2 starts to turn in the clamping direction A and the clamp spring 5 gradually releases the strain energy stored therein during hoisting. On contact of the pallet 1 with the clamp frame 12, continued turning of the hook piece 2 pushes the clamp slide 27 towards the anchor block 13 via the link 18 and, in the position shown in FIG. 10B, the clamp slide 27 is brought into engagement with the anchor block 13.

Figure 11A:
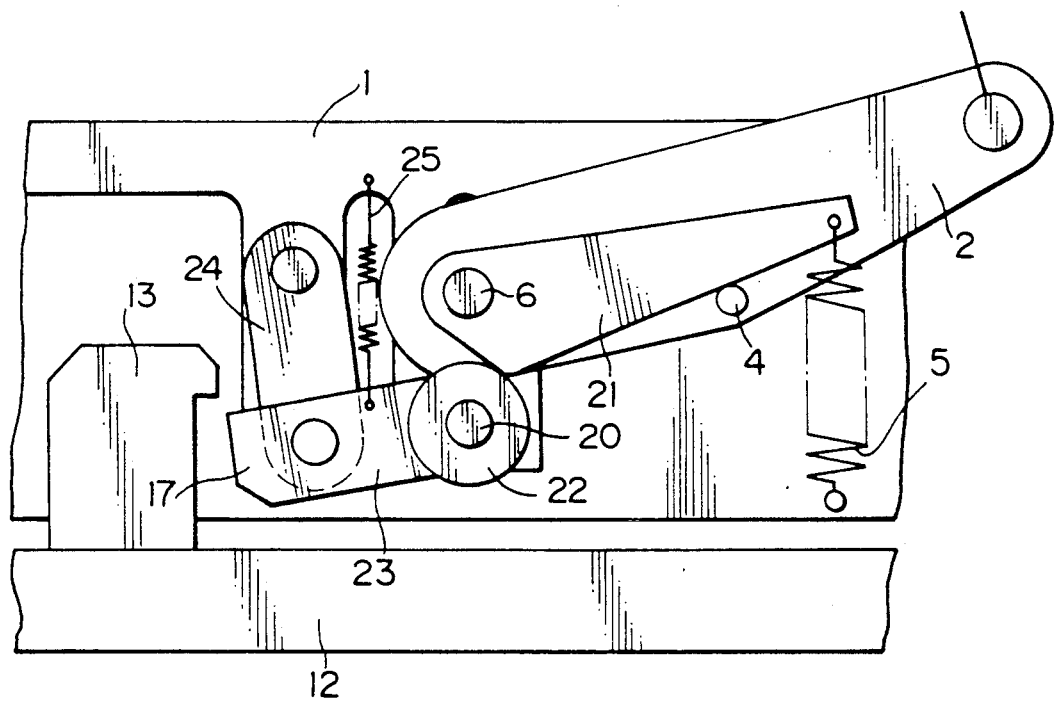
Figure 11B:
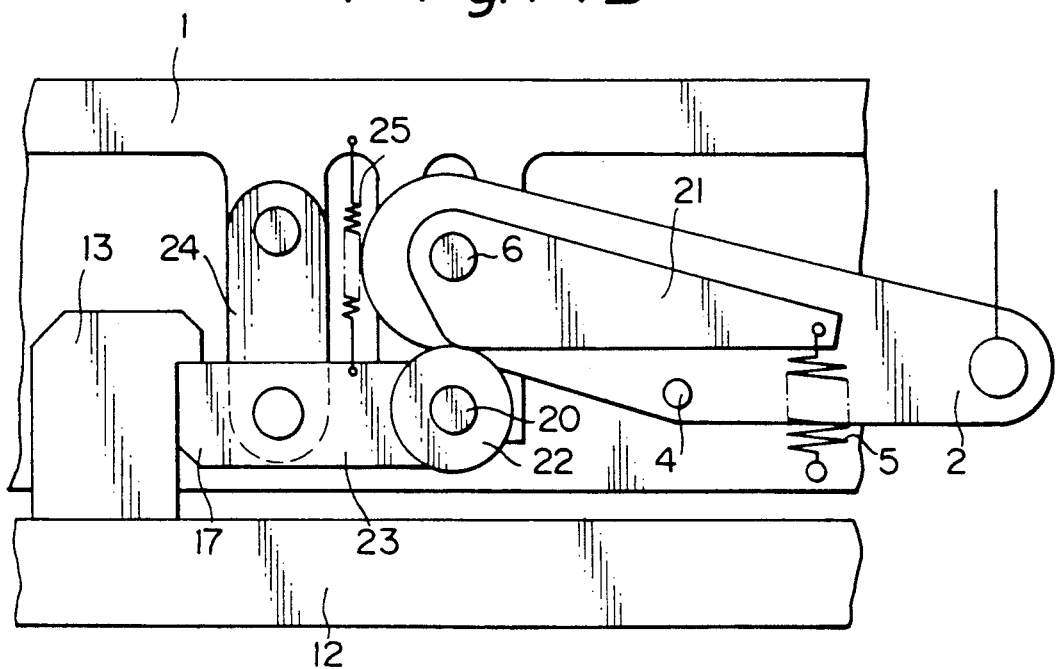

The other embodiment of the auto-clamper in accordance with the present invention is shown in FIGS. 11A and 11B, in which the hook piece 2 is connected to the clamper head via a cam mechanism. More specifically, a cam plate 21 is fixed at one end to the support shaft 6 in parallel to the hook piece 2 whilst extending in a direction same as the hook piece 2. The other end of the plate cam 21 is connected to the clamp spring 5. The stopper 4 in this case is fixed to the body of the hook piece 2. A horizontal shaft 20 is received in a vertical slot (not shown in the illustration) in a vertically slidable arrangement and a cam roller 22 is rotatably mounted to the shaft 20. By operation of the clamp spring 5 the cam roller 22 is always kept in pressure contact with the lower face of the plate cam 21. A substantially horizontal link 23 is fixed at one end to the cam roller 22 and the clamper head in this case is given in the form of a clamp nose 17 formed at the other end of the link 23. An arm 24 is pivoted at its upper end to the pallet 1 and, at the lower end, to the body of the link 23. A back-up spring spring 25 is interposed between the link 23 and the pallet 1.

In the position shown FIG. 11A, the pallet 1 is hoisted and turning of the hook piece 2, i.e. the plate cam 21 in the unclamping direction to cause lifting of the cam roller 22. The clamp nose 17 of the link 23 is brought out of engagement with the anchor block 13 on the clamp frame 12, and the clamp spring 5 is stretched to store the strain energy therein. In the position shown in FIG. 11B, the pallet 1 is already in contact with the clamp frame 12 and the cam roller 22 is pushed down by the corresponding turning of the plate cam 21 in the clamping direction. By release of the strain energy by the clamp spring 5 the clamp nose 17 is brought into firm engagement with the anchor block 13 on the clamp frame.

Figure 12A:
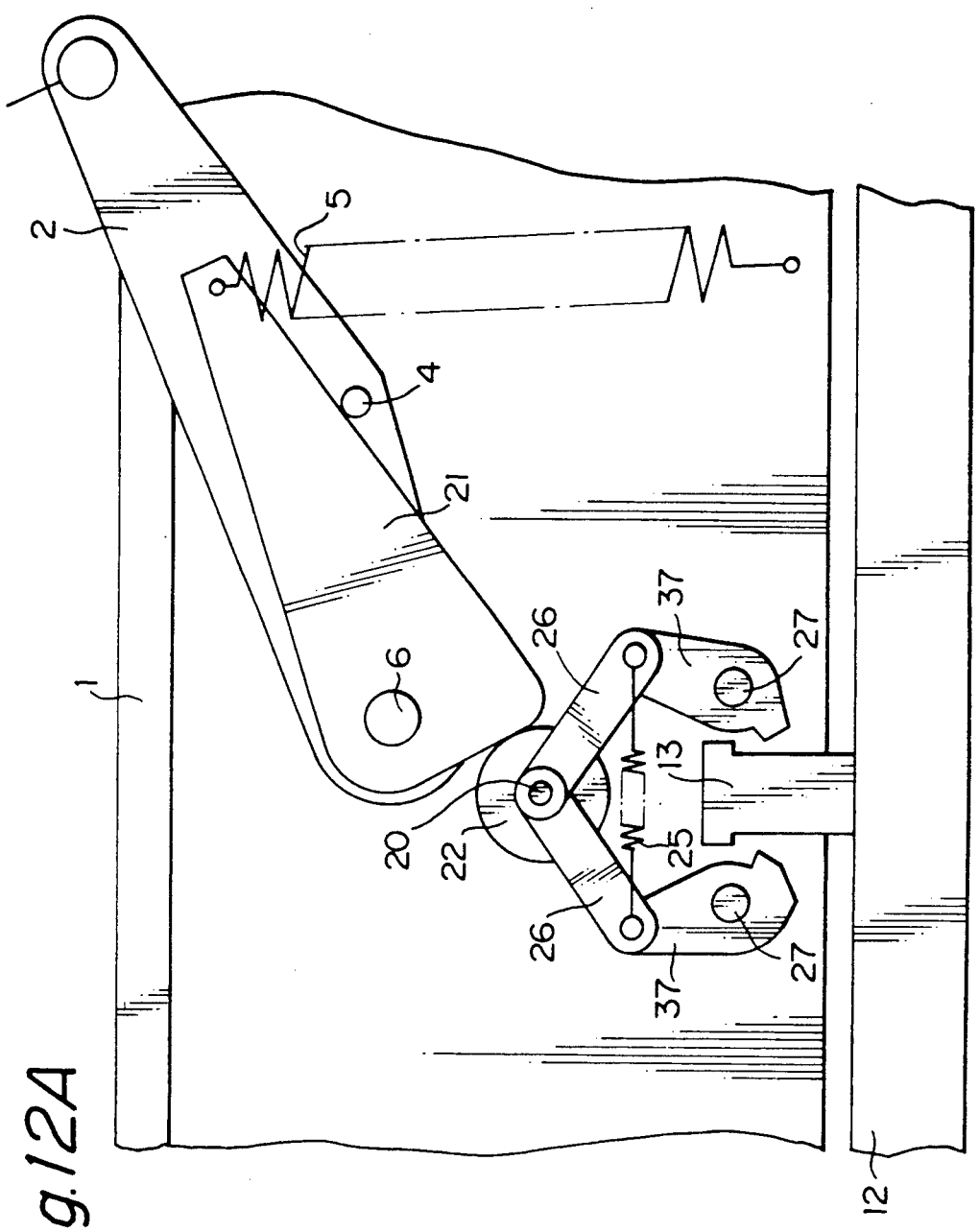
Figure 12B:
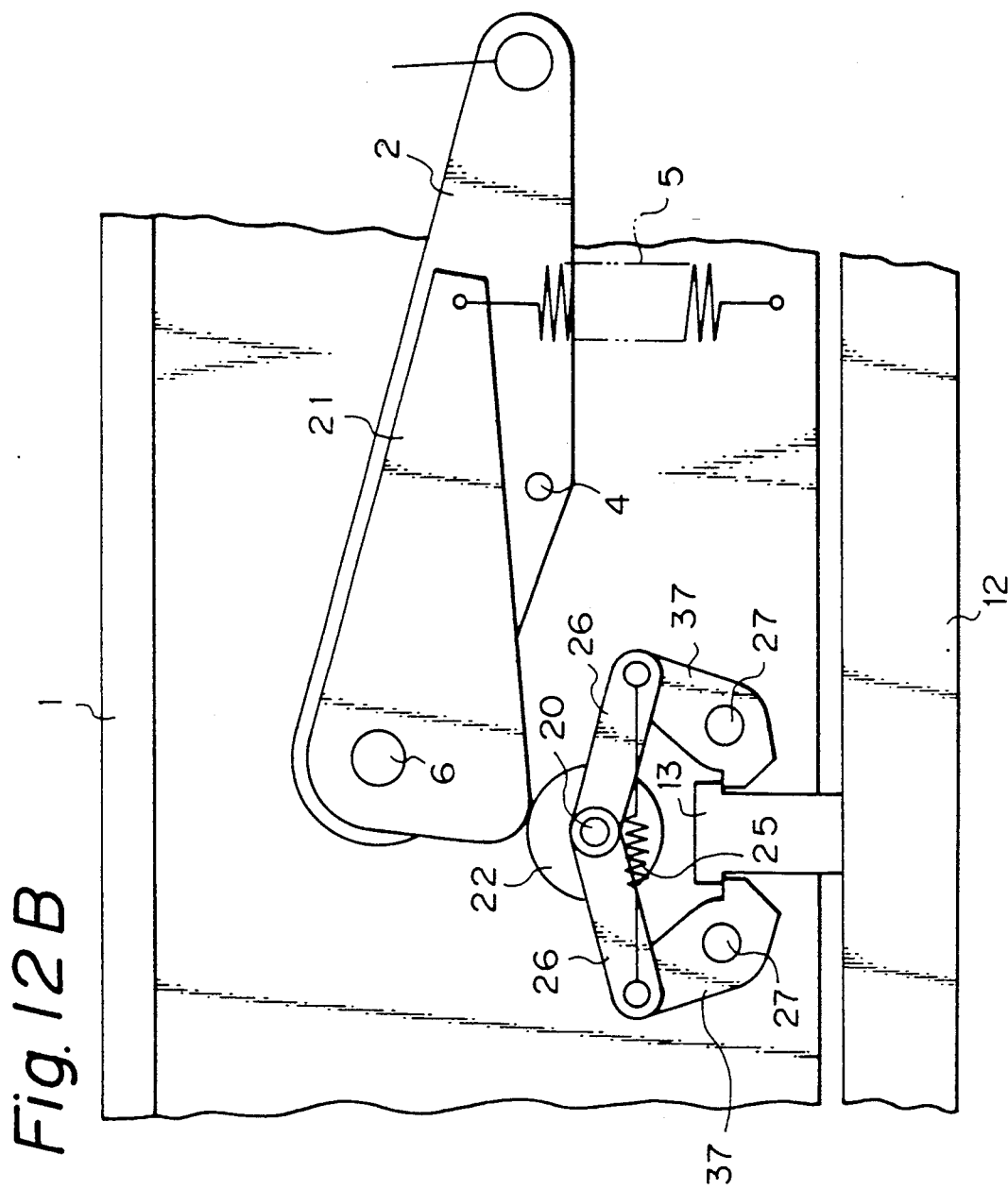

A variant of the auto-camper of FIGS. 11A and 11B is shown in FIGS. 12A and 12B, in which the clamper head is given in the form of a pair of clamp pawls 37. More specifically, a pair of links 26 are inserted at the upper ends over the center shaft 20 of the cam roller 22 and the lower end of each link 26 is pivoted to the upper end of the pawl 37 which is mounted to a horizontal pivot 27 on the pallet 1. The back-up spring 25 in this example is interposed between the pair of clamp pawls 37.

In the position shown in FIG. 12A the clamp pawls 37 are placed out of engagement with the anchor block 13 on the clamp frame 12 whereas, in the position shown in FIG. 12B, the clamp pawls 37 bite the anchor block 13 from the both sides.

Figure 13A:
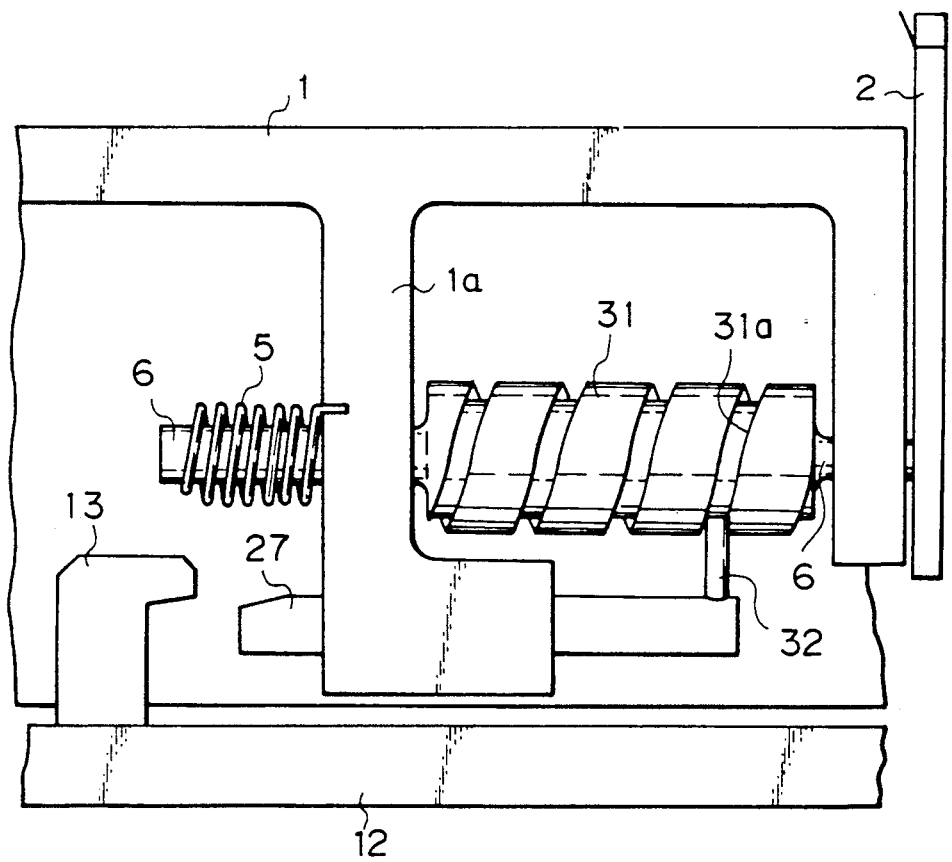
Figure 13B:
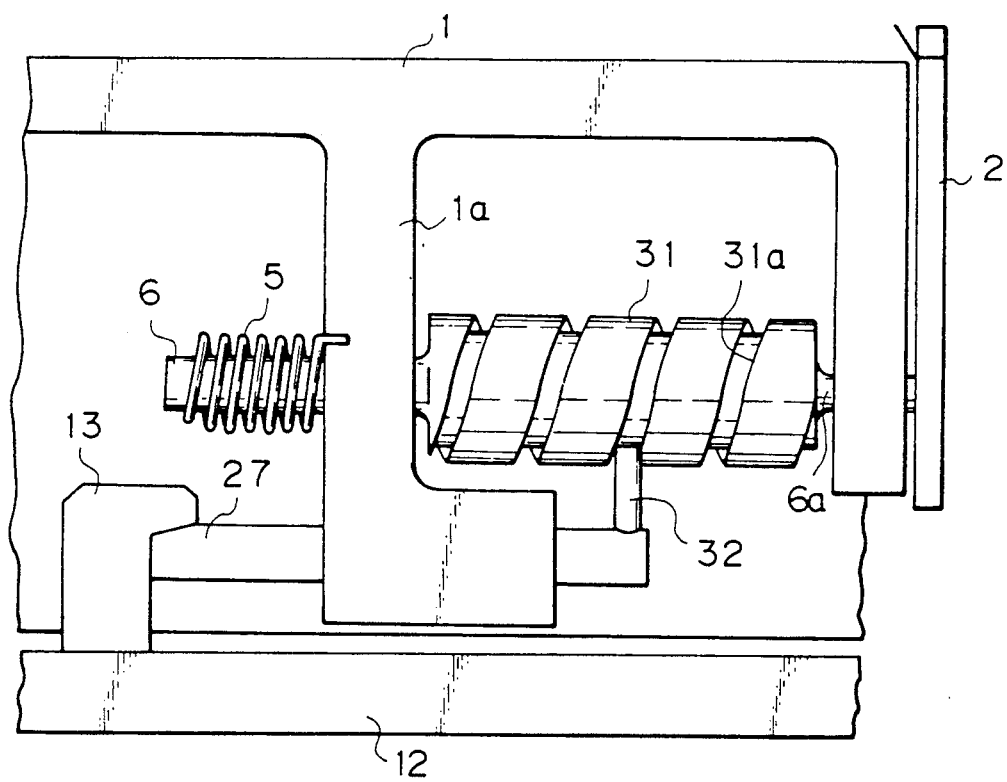

The other embodiment of the auto-clamper in accordance with the present invention is shown in FIGS. 13A and 13B, in which a cylindrical cam is used for connecting the hook piece 2 to the clamper head. The cylindrical cam 31 is concentrically secured to the support shaft 6 of the hook piece 2 and provided with a spiral groove 31a. The clamp spring 5 in this example is given in the form of a coil spring. One end of the coil spring is fixed to the pallet 1 and the other end of the coil spring is fixed to the support shaft in a manner to constantly surge the hook piece 2 to move in the clamping direction. Like the embodiment shown in FIG. 10A, the clamp slide 27 is horizontally guided by the leg 1a of the pallet 1 for movement towards and away from the anchor block 13 on the clamp frame 12. This clamp slide 27 is provided with a projection 32 extending upwards into engagement with the spiral groove 31a in the cylindrical cam 31. Rotation of the cylindrical cam 31 due to turning of the hook piece 2 caused engagement of the clamp slide 27 with the anchor block 13 as shown in FIG. 13B.

Figure 14A:
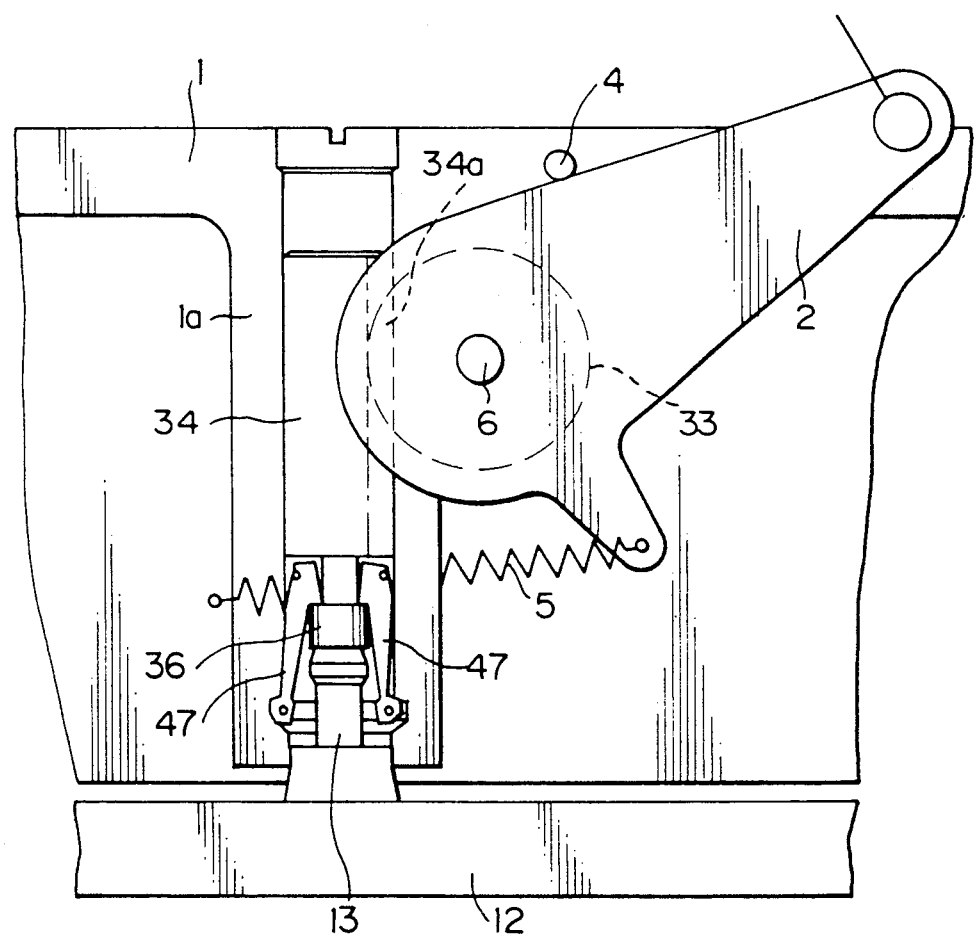
Figure 14B:
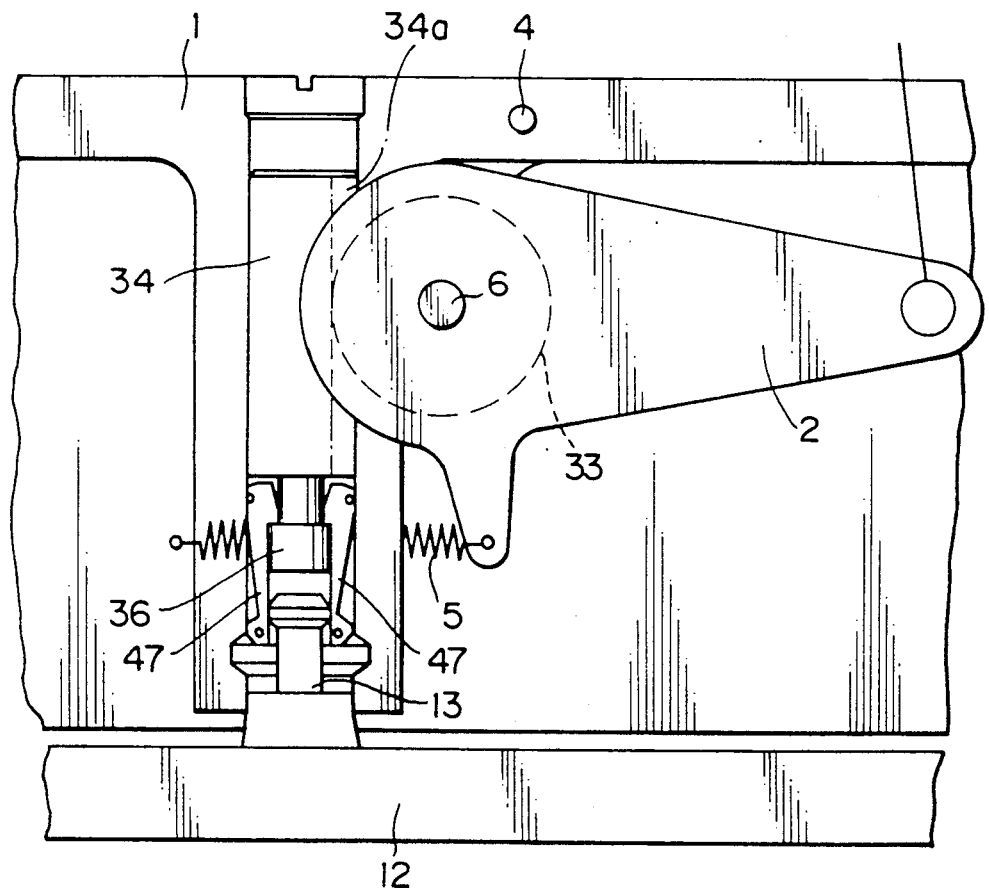

In the case of an embodiment shown in FIGS. 14A and 14B, the hook piece 2 is connected to the clamper head via a pinion-rack mechanism. More specifically, a pinion 33 is fixed to the support shaft 6 for the hook piece 2. A rack cylinder 34 is mounted in the leg 1a of the pallet 1 in a vertically slidable arrangement and provided with a rack 34a kept in meshing engagement with the pinion 33 on the support shaft 6. This rack cylinder 34 is provided at its lower end with an opener 36. In an arrangement to sandwich the opener 36 a pair of clamp fingers 37 are pivoted to the pallet 1 at positions on both sides of the anchor block 13 on the clamp frame 12.

As the hook piece 2 turns in the unclamping direction B in FIG. 14A, the opener 36 is lowered to swing the clamp fingers 47 laterally outwards out of engagement with the anchor block 13 due to the pinion-rack engagement. As the hook piece 2 turns in the clamping direction A as shown in FIG. 14B, the opener 36 is moved upwards to cause inward swing of the clamp fingers 47 which thereupon firmly catch the anchor block 13.

Figure 15:
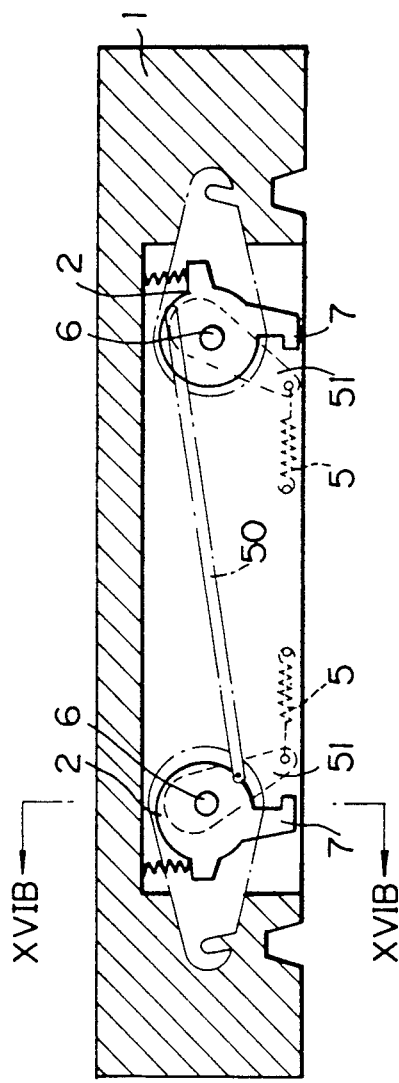

As stated already, the auto-clamper in accordance with the present invention is in practice provided with two or more clamp units each including the hook piece 2 and its associated elements such as the clamper head. In the case of the foregoing embodiments, the plurality of clamp units are designed to operate quite independently from each other. This independent mode of operation, however, has an innegligible drawback in practice. When the pallet loses its balance during hoisting, the pallet contacts the clamp frame 12 in a more or less inclined state and the clamp head near the spot of the first contact engages with its associated anchor block 13 prior to engagement of other clamper heads with their associated anchor blocks. Such an advanced engagement at one clamper head often hinders subsequent engagement at other clamper heads. In order to well avoid such a trouble operation of the individual clamp unit should preferably be synchronized with each other. One embodiment of the auto-clamper in accordance with the present invention shown in FIGS. 15, 16A and 16B is proposed from this point of view.

As in the foregoing embodiments, each clamp unit includes the hook piece 2 secured to the rotatable support shaft 6 on the pallet 1. The hook pieces 2 of different clamp units are linked with each other by a connecting rod 50 as shown in FIG. 15.

Figure 16A:
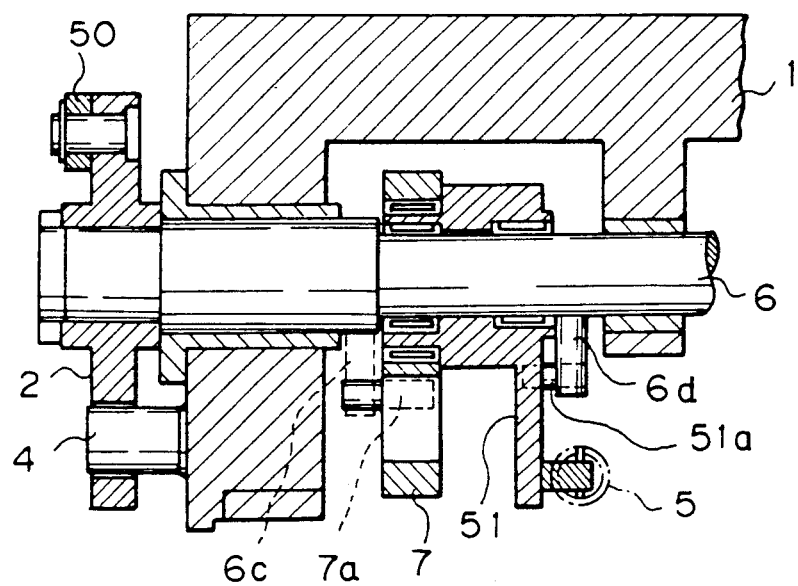
Figure 16B:
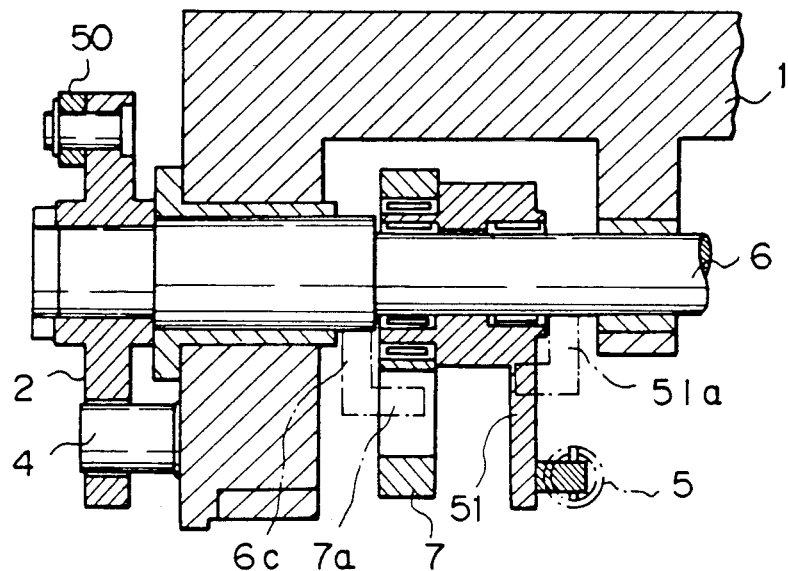

As best seen in FIG. 16A a sleeve 51 is rotatably mounted to the support shaft 6 in parallel to the hook piece 2 and the clamp piece 7 is rotatable inserted over an eccentric section of the sleeve 51. The clamp piece 7 is provided with a pin 7a and a stopper pin 6c projects radially from the support shaft 6 to limit turning of the clamp piece 7. The sleeve 51 is provided with a pin 51a and a stopper pin 6d projects radially from the support shaft 6 to limit turning of the clamp piece 7. The clamp piece 7 is always urged to move in the clamping direction by the clamp spring 5 interposed between itself and the pallet 1.

Figure 17A:
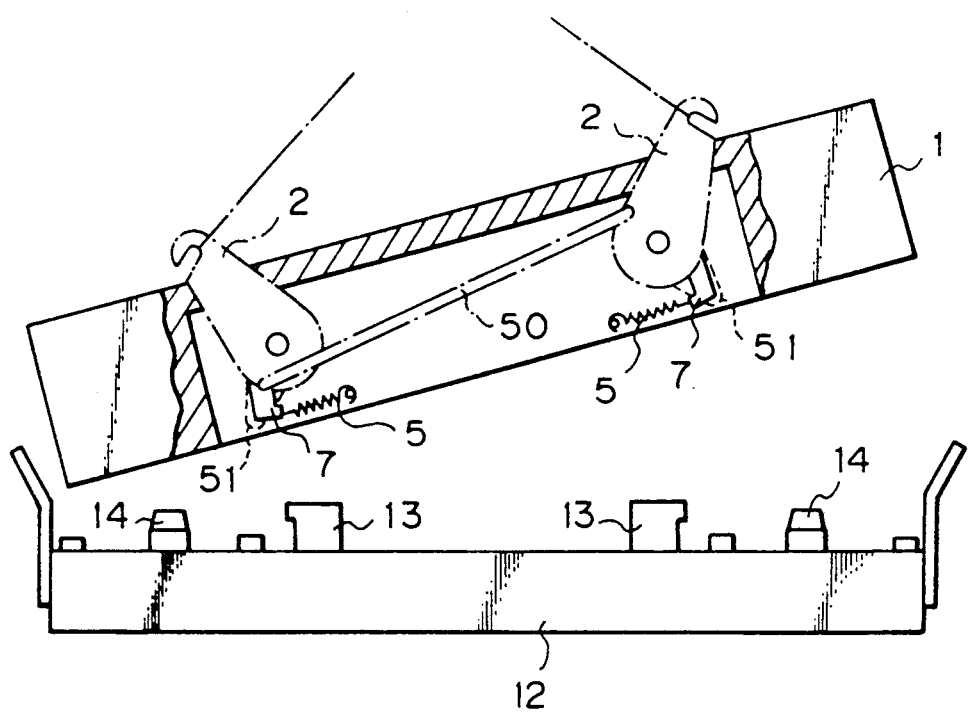
Figure 17B:
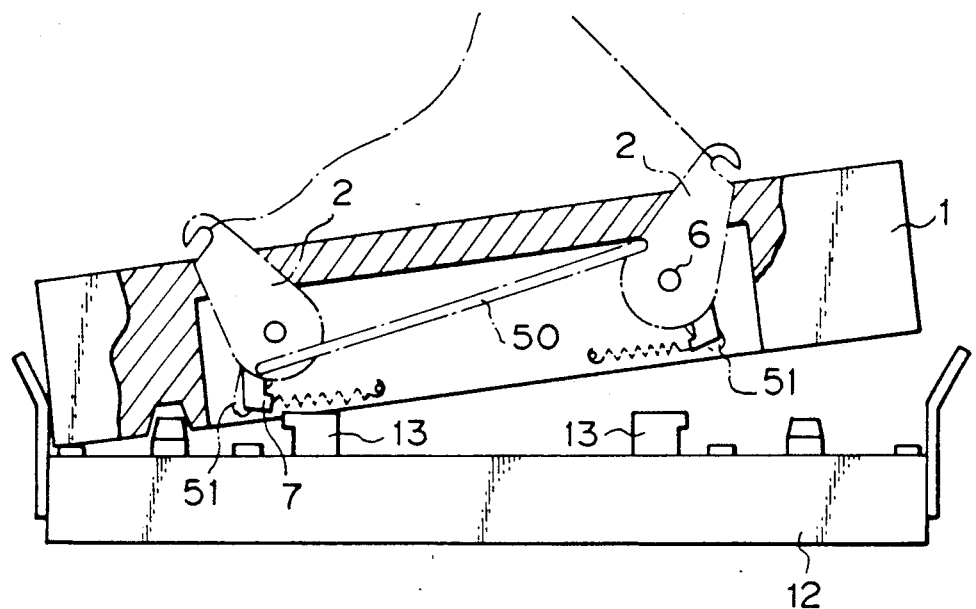
Figure 17C:
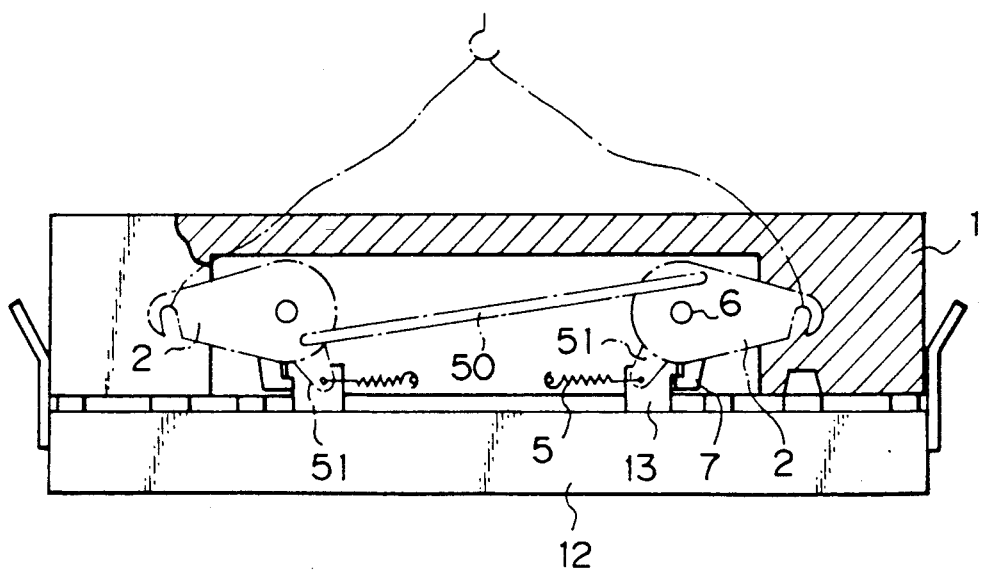

The auto-clamper operates as shown in FIGS. 17A to 17C.

Under the condition shown in FIG. 17A the pallet 1 is somewhat inclined and the left side end of the pallet 1 in the illustration is closer to the clamp frame 12 than the right side end. In this position, the pin 7a on the clamp piece 7 abuts the stopper pin 6c on the support shaft 6 and the pin 51a on the sleeve 51 abuts the stopper pin 6d on the support shaft 6. The moment acting on the support shaft 6 via the associated hook piece 2 and generated by the weights of the pallet 1 and the workpiece on it exceeds the moment acting on the support shaft 6 via the sleeve 51 and generated by the clamp spring 5.

Under the condition shown in FIG. 17B the left side end of the pallet 1 is already in contact with the clamp frame 12 and the clamp piece 7 of the left side clamp unit approaches the anchor block 13 on the clamp frame 12. In this position the hoist cord connected to the left side hook piece 2 is already in slack but the hoist cord connected to the right side hook piece 2 is still in tension. Despite the slack in the hoist cord, the left side hook piece 2 does not change its position shown in FIG. 17A since this hook piece 2 is mechanically connected to the right side hook piece 2 via the connecting rod 50 and the hoist cord connected to the right side hook piece 2 is still in tension. In other word, no hook pieces 2 start the clamping operation until hoist cords of all hook pieces 2 are in slack.

Under the condition shown in FIG. 17C all cords are now in slack and all hook pieces 2 are now in position to start the clamping operation.

I claim:

1. An improved auto-clamper for a pallet comprising
at least one hook piece fixed to a horizontal support shaft rotatably mounted to said pallet in an arrangement turnable in a vertical direction and connected to a hoist mechanism for said pallet,
a clamp piece connected to said hook piece for rotation therewith by said support shaft which has a first and second sections, said first section being thicker than and having a different center axis from said second section which is attached to said claim piece, and
a clamp spring having a first and a second end and fixed at said first end of said pallet and operably linked to said clamp piece by said second end of said clamp spring which is fixed to said hook piece such that said hook piece and said clamp piece are constantly urged in a clamping direction and wherein said clamp piece and said hook piece rotate in an unclamping direction when said pallet is lifted by a hoist mechanism.

2. An auto-clamper as claimed in claim 1 further comprising a clamp nose formed at a free end of said hook piece.

3. An auto-clamper as claimed in claim 1 in which
said clamper piece is a clamp slide which is guided in said pallet for horizontal movement and connected to said hook piece via a single link.

4. An auto-clamper as claimed in claim 1 in which
a plate cam is fixed at one end to said support shaft and connected at the other end to said clamp spring,
a cam roller is supported by said pallet in a vertically movable arrangement and spring loaded in pressure contact with said cam plate, and
said clamper piece is a clamp nose formed at the free end of a substantially horizontal link which is fixed at the other end to said cam roller.

5. An auto-clamper as claimed in claim 1 in which
a plate cam is fixed at one end to said support shaft and connected at the other end to said clamp spring,
a cam roller is supported by said pallet in a vertically movable arrangement and spring loaded in pressure contact with said cam, and
said clamper piece includes a pair of clamp pawls mounted to horizontal pivots on said pallet below said cam roller, and
each said clamp pawl is connected at the top end to the center shaft of said cam roller via a link.

6. An auto-clamper as claimed in claim 1 in which
a cylindrical cam provided with a spiral groove is secured to said support shaft for said hook piece,
said clamp spring is a coil spring embracing said support shaft which is fixed at one end to said pallet and, at the other end, to said support shaft, and
said clamper piece is a horizontal clamp slide which is slidably mounted to said pallet and provided with a projection kept in engagement with said spiral groove in said cylindrical cam.

7. An auto-clamper as claimed in claim 1 in which
a pinion is fixed to said support shaft for said hook piece in engagement with a rack formed on a rack cylinder mounted to said pallet in a vertically movable arrangement, and
said clamper piece includes a pair of clamp fingers which are pivoted to said pallet and driven for lateral swing by movement of an opener coupled to the lower end of said rack cylinder.

8. An auto-clamper as claimed in claim 1 in which
at least two hook pieces are used, and
said hook pieces are connected to each other by a connecting rod for synchronized operation.

* * * * *